United States Patent
Westphal et al.

(10) Patent No.: US 10,190,434 B2
(45) Date of Patent: Jan. 29, 2019

(54) TURBINE SHROUD WITH LOCATING INSERTS

(71) Applicants: Rolls-Royce Corporation, Indianapolis, IN (US); Rolls-Royce North American Technologies, Inc., Indianapolis, IN (US)

(72) Inventors: William Westphal, Avon, IN (US); Aaron D. Sippel, Zionsville, IN (US); Ted J. Freeman, Danville, IN (US)

(73) Assignees: Rolls-Royce North American Technologies Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 660 days.

(21) Appl. No.: 14/869,532

(22) Filed: Sep. 29, 2015

(65) Prior Publication Data
US 2016/0123171 A1  May 5, 2016

Related U.S. Application Data

(60) Provisional application No. 62/072,111, filed on Oct. 29, 2014.

(51) Int. Cl.
| | |
|---|---|
| F01D 11/08 | (2006.01) |
| F01D 25/24 | (2006.01) |
| F01D 5/02 | (2006.01) |
| F01D 9/04 | (2006.01) |

(52) U.S. Cl.
CPC .............. *F01D 11/08* (2013.01); *F01D 5/02* (2013.01); *F01D 9/04* (2013.01); *F01D 25/24* (2013.01); *F01D 25/243* (2013.01); *F05D 2220/30* (2013.01); *F05D 2240/11* (2013.01); *F05D 2250/75* (2013.01); *F05D 2260/30* (2013.01); *F05D 2300/2112* (2013.01); *F05D 2300/224* (2013.01); *F05D 2300/2261* (2013.01);
(Continued)

(58) Field of Classification Search
CPC ......... F01D 11/08; F01D 25/24; F01D 25/243
See application file for complete search history.

(56) References Cited

U.S. PATENT DOCUMENTS

| | | |
|---|---|---|
| 3,601,414 A | 8/1971 | Rao |
| 4,087,199 A | 5/1978 | Hemsworth et al. |
| 4,477,086 A | 10/1984 | Feder et al. |

(Continued)

FOREIGN PATENT DOCUMENTS

| | | |
|---|---|---|
| DE | 102008044450 A1 | 2/2009 |
| EP | 1965030 A2 | 9/2008 |

(Continued)

OTHER PUBLICATIONS

Extended European Search Report, European Application No. 15188791.6-1610 / 3018294, dated Apr. 13, 2016, 10 pages.
(Continued)

*Primary Examiner* — Woody A Lee, Jr.
(74) *Attorney, Agent, or Firm* — Barnes & Thornburg LLP

(57) ABSTRACT

A turbine shroud for a gas turbine engine includes an annular metallic carrier, a blade track, and a cross-key connection formed between the annular metallic carrier and the ceramic blade track. The cross-key connection is formed between the annular metallic carrier and inserts included in the blade track.

20 Claims, 10 Drawing Sheets

(52) U.S. Cl.
CPC ............... *F05D 2300/437* (2013.01); *F05D 2300/6033* (2013.01); *Y02T 50/672* (2013.01)

(56) References Cited

U.S. PATENT DOCUMENTS

| | | | |
|---|---|---|---|
| 4,646,810 A | | 3/1987 | Lardellier |
| 4,679,981 A | | 7/1987 | Guibert et al. |
| 4,863,345 A | | 9/1989 | Thompson et al. |
| 4,986,737 A | * | 1/1991 | Erdmann ............ B23P 15/006 |
| | | | 416/190 |
| 5,163,809 A | | 11/1992 | Akgun et al. |
| 5,738,490 A | | 4/1998 | Pizzi |
| 6,142,731 A | | 11/2000 | Dewis et al. |
| 6,315,519 B1 | | 11/2001 | Bagepalli et al. |
| 6,517,313 B2 | * | 2/2003 | Rogers ................ F01D 9/04 |
| | | | 415/137 |
| 6,726,448 B2 | | 4/2004 | McGrath et al. |
| 6,733,233 B2 | | 5/2004 | Jasklowski et al. |
| 6,758,386 B2 | | 7/2004 | Marshall et al. |
| 6,758,653 B2 | | 7/2004 | Morrison |
| 6,896,483 B2 | | 5/2005 | Dierksmeier et al. |
| 6,910,853 B2 | | 6/2005 | Corman et al. |
| 7,090,459 B2 | | 8/2006 | Bhate et al. |
| 7,195,452 B2 | | 3/2007 | Allan et al. |
| 7,217,089 B2 | | 5/2007 | Durocher et al. |
| 7,234,306 B2 | | 6/2007 | Aumont et al. |
| 7,374,396 B2 | | 5/2008 | Martin et al. |
| 7,435,049 B2 | | 10/2008 | Ghasripoor et al. |
| 7,641,442 B2 | | 1/2010 | Denece et al. |
| 7,665,960 B2 | | 2/2010 | Shi et al. |
| 7,686,575 B2 | * | 3/2010 | Chehab ................ F01D 11/18 |
| | | | 29/889.22 |
| 7,771,160 B2 | | 8/2010 | Shi et al. |
| 7,914,256 B2 | | 3/2011 | Xie et al. |
| 7,988,395 B2 | | 8/2011 | Steffier |
| 8,047,773 B2 | | 11/2011 | Bruce et al. |
| 8,061,977 B2 | | 11/2011 | Keller et al. |
| 8,079,807 B2 | | 12/2011 | Shapiro et al. |
| 8,092,160 B2 | | 1/2012 | Shi et al. |
| 8,167,546 B2 | | 5/2012 | Shi et al. |
| 8,206,094 B2 | * | 6/2012 | Seki .................... F01D 5/225 |
| | | | 415/191 |
| 8,235,670 B2 | | 8/2012 | Morrison et al. |
| 8,257,029 B2 | | 9/2012 | Habarou et al. |
| 8,322,983 B2 | | 12/2012 | Marini |
| 8,328,505 B2 | | 12/2012 | Shi et al. |
| 8,496,431 B2 | | 7/2013 | Habarou et al. |
| 8,511,975 B2 | | 8/2013 | Shi et al. |
| 8,555,647 B2 | | 10/2013 | Dimascio et al. |
| 8,568,091 B2 | | 10/2013 | McCaffrey |
| 8,651,497 B2 | | 2/2014 | Tholen et al. |
| 8,684,689 B2 | | 4/2014 | Guo et al. |
| 8,739,547 B2 | | 6/2014 | Jarmon et al. |
| 8,740,552 B2 | | 6/2014 | Marusko et al. |
| 8,770,931 B2 | | 7/2014 | Alvanos et al. |
| 8,784,052 B2 | | 7/2014 | Shi et al. |
| 8,790,067 B2 | | 7/2014 | McCaffrey et al. |
| 8,801,372 B2 | | 8/2014 | Shi et al. |
| 8,814,173 B2 | | 8/2014 | Motzkus et al. |
| 8,834,106 B2 | | 9/2014 | Luczak |
| 8,926,270 B2 | | 1/2015 | Karafillis et al. |
| 9,011,079 B2 | | 4/2015 | Coign et al. |
| 9,752,592 B2 | * | 9/2017 | Sippel ................ F04D 29/522 |
| 2003/0082051 A1 | * | 5/2003 | Bertrand ............ F01D 9/042 |
| | | | 415/209.3 |
| 2004/0047726 A1 | | 3/2004 | Morrison |
| 2009/0208322 A1 | | 8/2009 | McCaffrey |
| 2010/0111678 A1 | | 5/2010 | Habarou et al. |
| 2010/0150703 A1 | | 6/2010 | Gonzalez et al. |
| 2010/0232941 A1 | | 9/2010 | Smoke et al. |
| 2011/0052384 A1 | | 3/2011 | Shi et al. |
| 2011/0057394 A1 | | 3/2011 | Halling |
| 2011/0150635 A1 | | 6/2011 | Motzkus et al. |
| 2011/0274538 A1 | | 11/2011 | Shi et al. |
| 2012/0070276 A1 | | 3/2012 | Shi et al. |
| 2012/0107107 A1 | * | 5/2012 | Chan .................. F01D 11/001 |
| | | | 415/182.1 |
| 2012/0156029 A1 | | 6/2012 | Karafillis et al. |
| 2012/0177488 A1 | | 7/2012 | Corman |
| 2012/0247124 A1 | * | 10/2012 | Shapiro ................ F01D 9/04 |
| | | | 60/805 |
| 2012/0263582 A1 | | 10/2012 | Foster et al. |
| 2012/0301269 A1 | | 11/2012 | Alvanos et al. |
| 2012/0301303 A1 | | 11/2012 | Alvanos et al. |
| 2012/0301312 A1 | | 11/2012 | Berczik et al. |
| 2012/0308367 A1 | | 12/2012 | Luczak |
| 2013/0008176 A1 | | 1/2013 | Shi et al. |
| 2013/0011248 A1 | | 1/2013 | Croteau et al. |
| 2013/0177384 A1 | | 7/2013 | Coign et al. |
| 2013/0177411 A1 | | 7/2013 | Weber et al. |
| 2014/0202168 A1 | | 7/2014 | Shapiro et al. |
| 2014/0260320 A1 | | 9/2014 | Graves et al. |
| 2014/0271144 A1 | * | 9/2014 | Landwehr ............ F01D 11/08 |
| | | | 415/173.1 |
| 2015/0044044 A1 | * | 2/2015 | Sippel ................ F01D 9/04 |
| | | | 415/220 |
| 2016/0123171 A1 | | 5/2016 | Westphal et al. |
| 2016/0177786 A1 | | 6/2016 | Sippel et al. |
| 2016/0208635 A1 | | 7/2016 | Vetters et al. |
| 2016/0222812 A1 | | 8/2016 | Sippel et al. |

FOREIGN PATENT DOCUMENTS

| | | |
|---|---|---|
| EP | 2589774 A1 | 5/2013 |
| EP | 2604805 A2 | 6/2013 |
| FR | 2580033 A1 | 10/1986 |
| GB | 2235730 A | 3/1991 |
| GB | 2468768 A | 9/2010 |
| GB | 2480766 A | 11/2011 |
| JP | 39250304 A | 9/1997 |
| JP | 39264104 A | 10/1997 |
| WO | 2010058137 A1 | 5/2010 |
| WO | 2011157956 A1 | 12/2011 |
| WO | 2014120334 A1 | 8/2014 |
| WO | 2014143225 A1 | 9/2014 |
| WO | 2014163674 A1 | 10/2014 |

OTHER PUBLICATIONS

Corman, Gregory S. and Luthra, Krishan L.; Melt Infiltrated Ceramic Composites (HIPERCOMP®) for Gas Turbine Engine Applications; DOE/CE/41000-3; May 1994-Sep. 2005; pp. 1-507.

Blosser, Max L.; Thermal Stress in High Temperature Cylindrical Fasteners; NASA Technical Memorandum; May 1988; pp. 1-12.

Blosser, Max L. and McWithey, Robert R.; Theoretical Basis for Design of Thermal-Stress-Free Fasteners; NASA Technical Paper; Dec. 1983; pp. 1-26.

European Office Action dated Nov. 6, 2018 and issued in connection with EP Appln. No. 15188791.6, 5 pages.

* cited by examiner

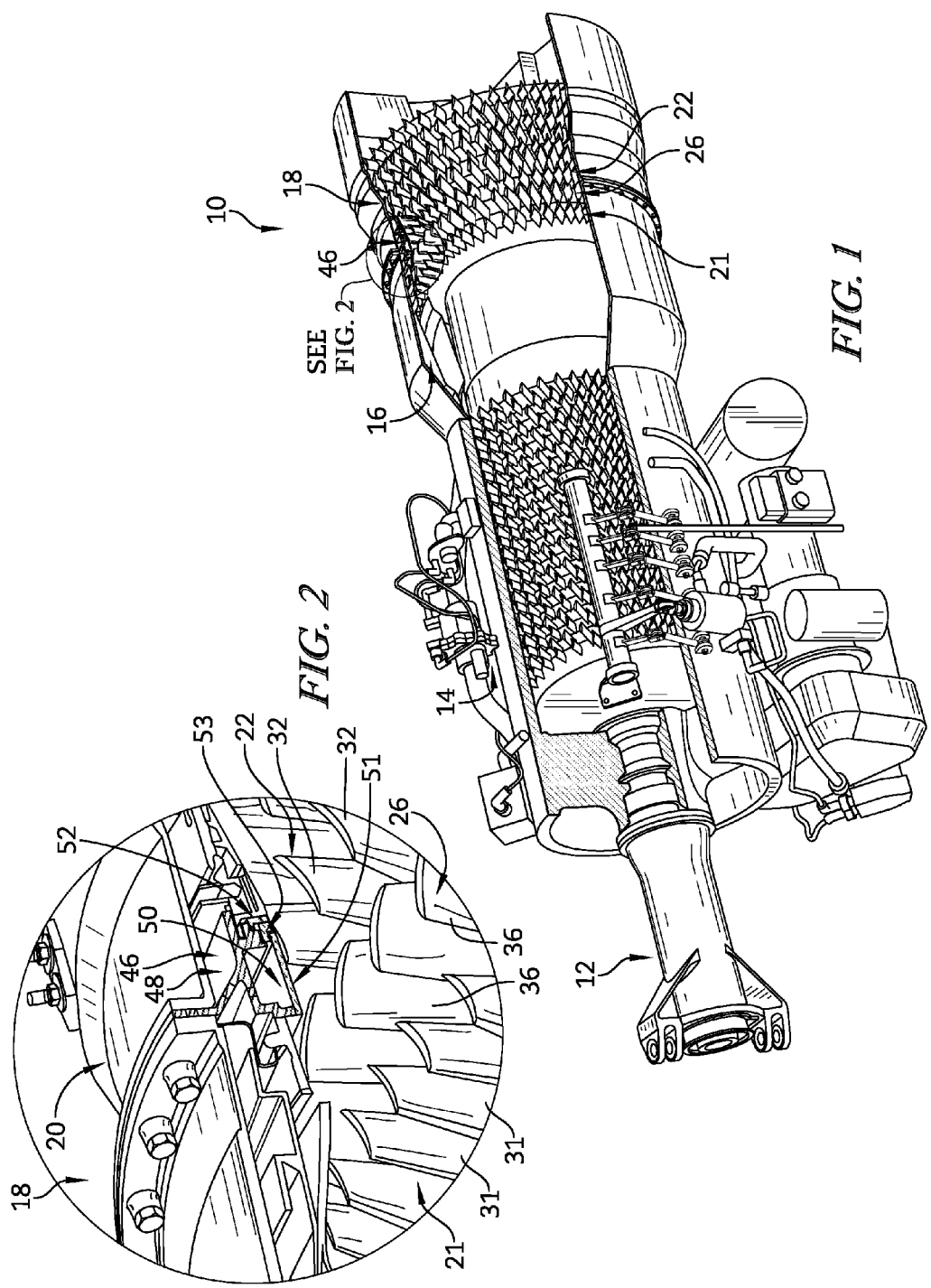

TURBINE SHROUD WITH LOCATING INSERTS

CROSS REFERENCE TO RELATED APPLICATIONS

This application claims priority to and the benefit of U.S. Provisional Patent Application No. 62/072,111, filed 29 Oct. 2014, the disclosure of which is now expressly incorporated herein by reference.

FIELD OF THE DISCLOSURE

The present disclosure relates generally to gas turbine engines, and more specifically to turbine shrouds used in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies. Such static shrouds may be coupled to an engine case that surrounds the compressor, the combustor, and the turbine.

Some shrouds positioned in the turbine may be exposed to high temperatures from products of the combustion reaction in the combustor. Such shrouds sometimes include components made from materials that have different coefficients of thermal expansion. Due to the differing coefficients of thermal expansion, the components of some turbine shrouds expand at different rates when exposed to combustion products. For example, coupling such components with traditional fasteners such as rivets or bolts may not allow for the differing levels of expansion and contraction during operation of the gas turbine engine.

SUMMARY

The present application discloses one or more of the features recited in the appended claims and/or the following features which, alone or in any combination, may comprise patentable subject matter.

According to an aspect of the present disclosure, a turbine shroud for use in the turbine section of a gas turbine engine is taught. The turbine blade track may include an annular ceramic runner and a plurality of inserts. The annular ceramic runner may be formed to include a plurality of cutouts extending inward in a radial direction from an outer radial surface of the annular ceramic runner toward an inner radial surface of the annular ceramic runner. The plurality of inserts may be coupled to the annular ceramic runner.

In some embodiments, each insert may include a stem arranged in the cutout and a cap arranged outside the cutout. The cap may extend from the stem in a circumferential direction and in an axial direction along the outer radial surface of the annular ceramic runner.

In some embodiments, turbine shroud may include a plurality of braze layers arranged between the annular ceramic runner and each of the plurality of inserts. The braze layers may be arranged in the cutout and the braze layers may be arranged between the radially outer surface of the annular ceramic runner and the caps of the inserts. In some embodiments, an aft side of each of the plurality of inserts may be coplanar with an aft side of the annular ceramic runner.

In some embodiments, the cutout may be spaced apart from a forward side of the annular ceramic runner and from an aft side of the annular ceramic runner. The cap may extend along the outer radial surface of the annular ceramic runner in both axial directions.

In some embodiments, the braze layers may comprise silicon and a transition metal. The braze layers may include a fluxing agent including at least one of boron and carbon. The braze layers may comprise a filler material including at least one of silicon carbide, polycarbosilanes, carbon, aluminum oxide, and MAX phase material. In some embodiments, the annular ceramic runner and the inserts both consist essentially of ceramic matrix composite.

According to another aspect of the present disclosure, a turbine blade track may include an annular ceramic runner arranged around a central axis, a plurality of inserts coupled to the annular ceramic runner, and a plurality of braze layers arranged between the annular ceramic runner and each of the plurality of inserts. The annular ceramic runner may be formed to include a plurality of cutouts extending inward in a radial direction from an outer radial surface of the annular ceramic runner toward an inner radial surface of the annular ceramic runner. Each insert may include a stem arranged in the cutout and a cap arranged outside the cutout.

In some embodiments, the cap of each insert may include a radially-inner portion and a radially outer portion. The radially-inner portion may extend circumferentially along the outer radial surface of the annular ceramic runner in both circumferential directions. The radially-outer portion may extend radially outward from the stem without extending circumferentially along the outer radial surface of the annular ceramic runner. In some embodiments, the cap may include fillets that form a radius between the radially outer portion of the cap and the radially inner portion of the cap on at least two sides of the radially outer portion of the cap.

In some embodiments, the stem and the cap may cooperate to form a lower case t shape. In some embodiments, each cutout may extend all the way through the annular ceramic runner from the outer radial surface to inner radial surface. In some embodiments, an inner radial surface of the stem may be flush with the inner radial surface of the annular ceramic runner.

According to another aspect of the present disclosure, a turbine shroud may include a metallic carrier and a blade track The metallic carrier may extend around an engine axis and may be formed to include a plurality of circumferentially spaced apart keyways that extend axially into the carrier. The blade track may include a ceramic annular runner formed to include a cutout, an insert arranged to extend into the cutout, and a braze layer bonded to the ceramic annular runner and the cutout.

In some embodiments, the insert may include a stem arranged in the cutout and a cap that extends outwardly in the radial direction from the stem. The cap may provide a key that extends into a corresponding keyway formed in the metallic carrier to establish a cross-key connection between the blade track and the metallic carrier. The cap may extend along the outer radial surface of the annular ceramic runner in an axial direction.

In some embodiments, an aft side of the insert may be coplanar with an aft side of the annular ceramic runner. In some embodiments, the cap may extend in both directions axially from the stem.

In some embodiments, the cutout may be spaced apart from a forward side of the annular ceramic runner and from an aft side of the annular ceramic runner. An aft side of the cap may be coplanar with an aft side of the annular ceramic runner.

These and other features of the present disclosure will become more apparent from the following description of the illustrative embodiments.

BRIEF DESCRIPTION OF THE DRAWINGS

FIG. 1 is a cut-away perspective view of a gas turbine engine including a turbine section;

FIG. 2 is a detail view of FIG. 1 showing a turbine shroud providing a track for blades of a turbine wheel assembly;

DETAILED DESCRIPTION OF THE DRAWINGS

Figure 3:
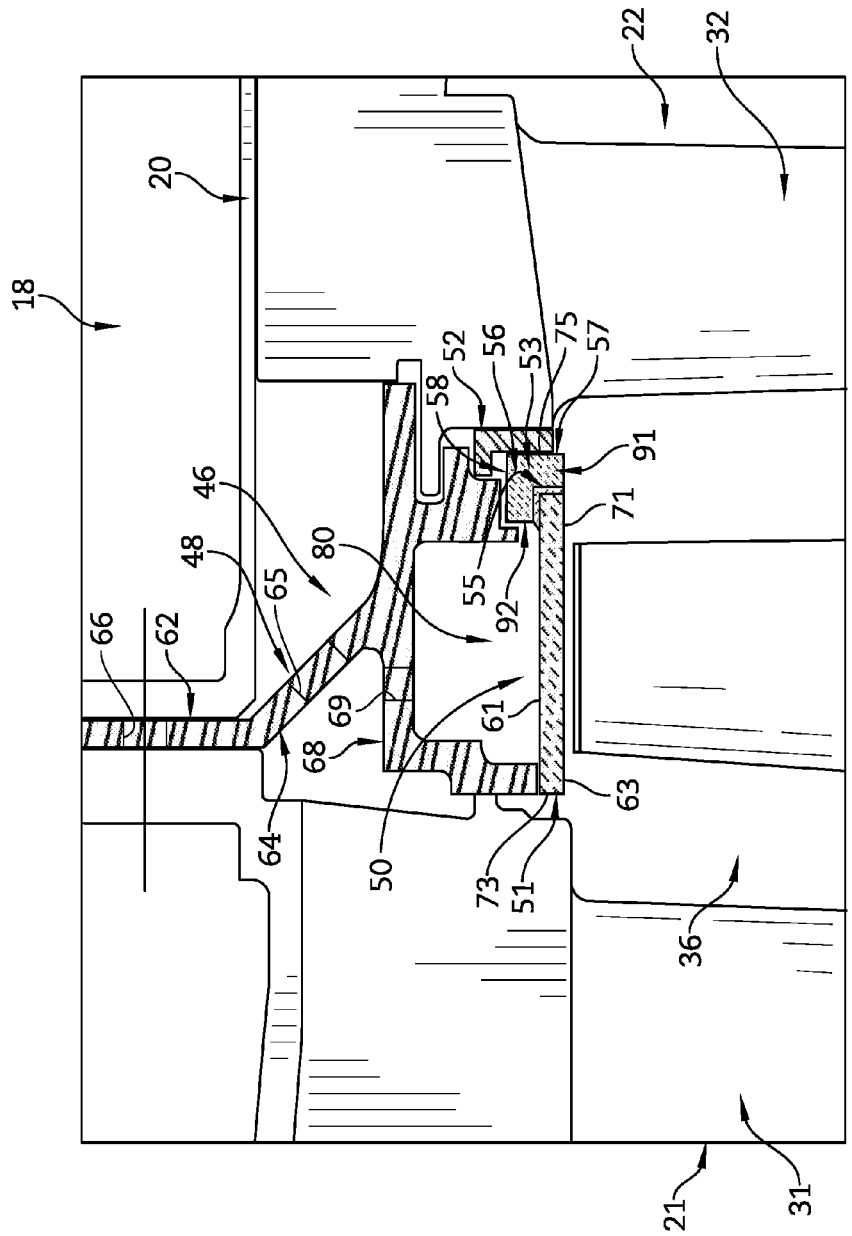
FIG. 3 is a partial cross-sectional view of the gas turbine engine of FIG. 1 showing the arrangement of the turbine shroud in the gas turbine engine.

For the purposes of promoting an understanding of the principles of the disclosure, reference will now be made to a number of illustrative embodiments illustrated in the drawings and specific language will be used to describe the same.

FIG. 1 is an illustrative aerospace gas turbine engine 10 cut-away to show that the engine 10 includes an output shaft 12, a compressor 14, a combustor 16, and a turbine 18 all mounted to a case 20. The output shaft 12 is configured to be coupled to a propeller and is driven by the turbine 18. The compressor 14 compresses and delivers air to the combustor 16. The combustor 16 mixes fuel with the compressed air received from the compressor 14 and ignites the fuel. The hot high pressure products of the combustion reaction in the combustor 16 are directed into the turbine 18 and the turbine 18 extracts work to drive the compressor 14 and the output shaft 12.

The turbine 18 illustratively includes static turbine vane assemblies 21, 22, a turbine wheel assembly 26 as shown in FIGS. 1 and 2. Each vane assembly 21, 22 includes a plurality corresponding of vanes 31, 32 and the turbine wheel assembly 26 includes a plurality of corresponding blades 36. The vanes 31, 32 of the vane assembly 21 direct the combustion products from the combustor 16 toward the blades 36 of the turbine wheel assemblies 26. The blades 36 are in turn pushed by the combustion products to cause the turbine wheel assembly 26 to rotate; thereby, driving the rotating components of the compressor 14 and/or the output shaft 12.

The turbine 18 also includes a turbine shroud 46 that extends around the turbine wheel assembly 26 to block combustion products from passing over the blades 36 without pushing the blades 36 to rotate. The exemplary first stage turbine shroud 46, shown in FIG. 2, extends around the first stage turbine wheel assembly 26 and is sized to block most combustion products from passing over the blades 36 without pushing the blades 36 to rotate. Combustion products that are allowed to pass over the blades 36 do not push the blades 36 and such passed-over products contribute to lost performance within the engine 10.

The turbine shroud 46 illustratively includes a carrier 48, a blade track (sometimes called seal ring) 50, and a retainer 52 as shown in FIGS. 2 and 3. The carrier 48 is an annular, round metallic component and is configured to support the blade track 50 in position adjacent to the blades 36 of the turbine wheel assembly 26. The illustrative blade track 50 is concentric with and nested into the carrier 48 along a rotational axis 11 of the engine 10. The retainer 52 engages both the carrier 48 and the blade track 50 to position the carrier 48 and the blade track relative to other static turbine components. In some embodiments, the carrier 48 may be made up of a number of segments that extend only part-way around the axis 11.

Figure 4:
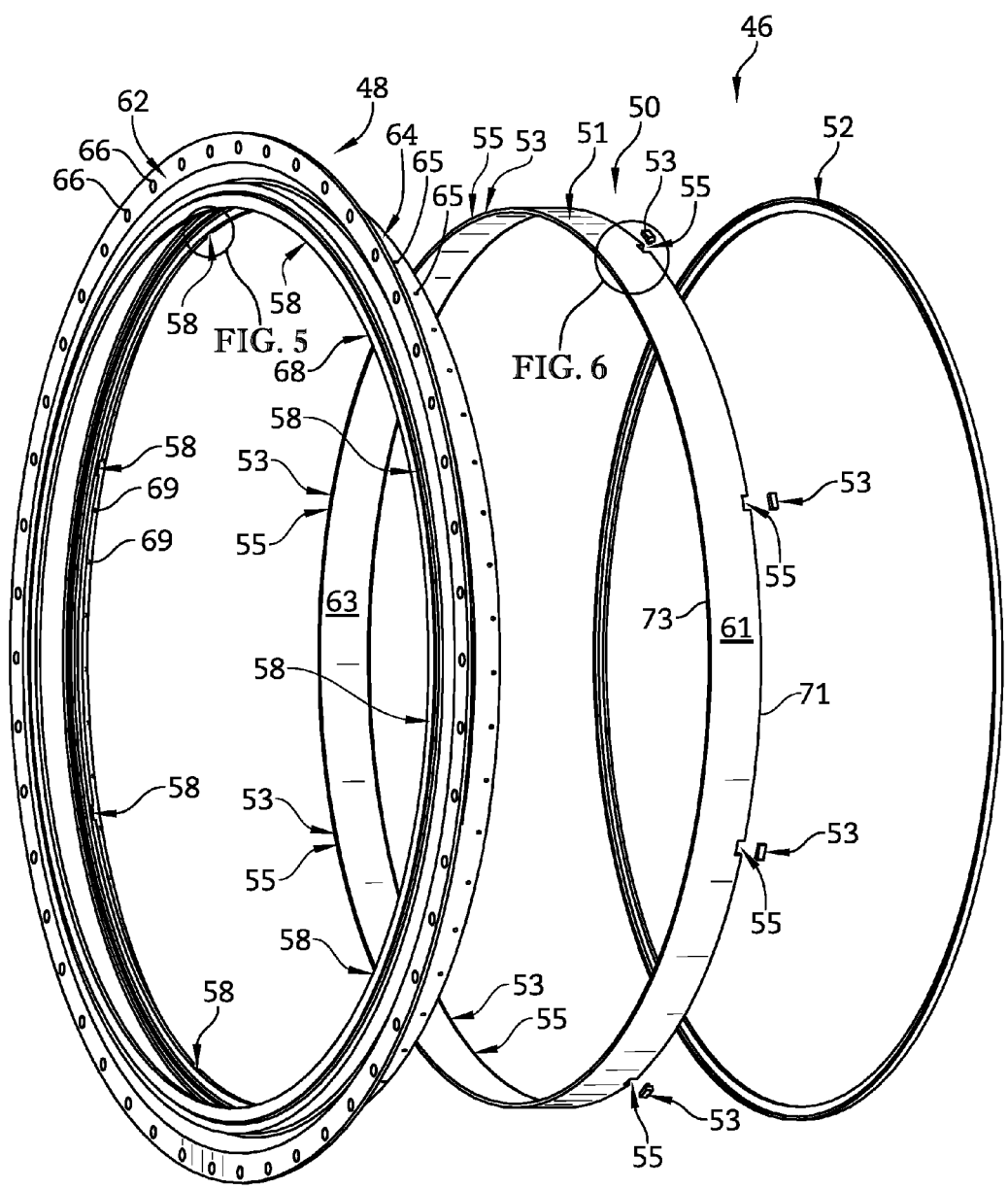
FIG. 4 is an exploded perspective view of the turbine shroud included in the gas turbine engine shown in FIGS. 1 and 2 showing that the turbine shroud includes a carrier, a blade track, and a retainer.
Figure 6:
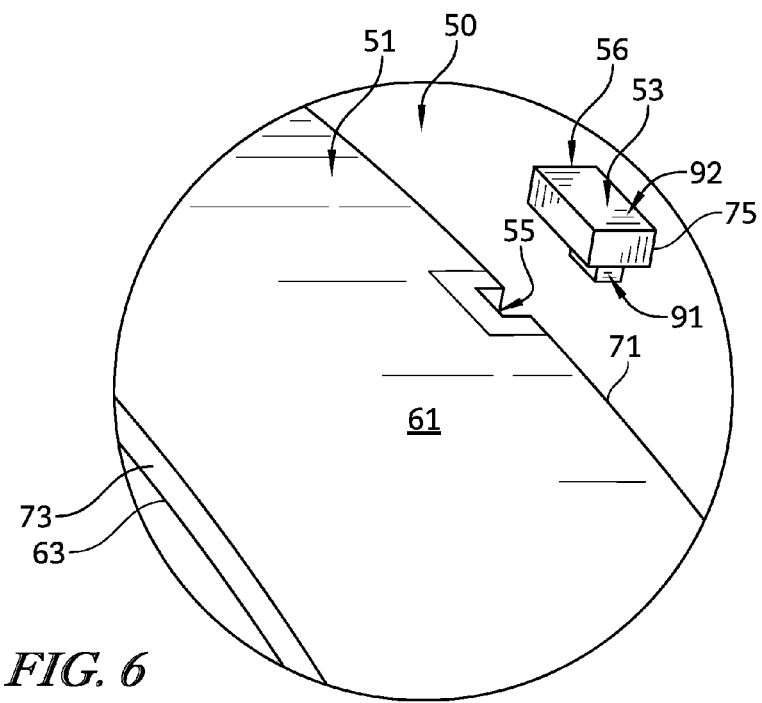
FIG. 6 is a detail perspective view of the blade track included in the turbine shroud of FIGS. 3 and 4 showing that the blade track includes an annular runner and an insert.
Figure 7:
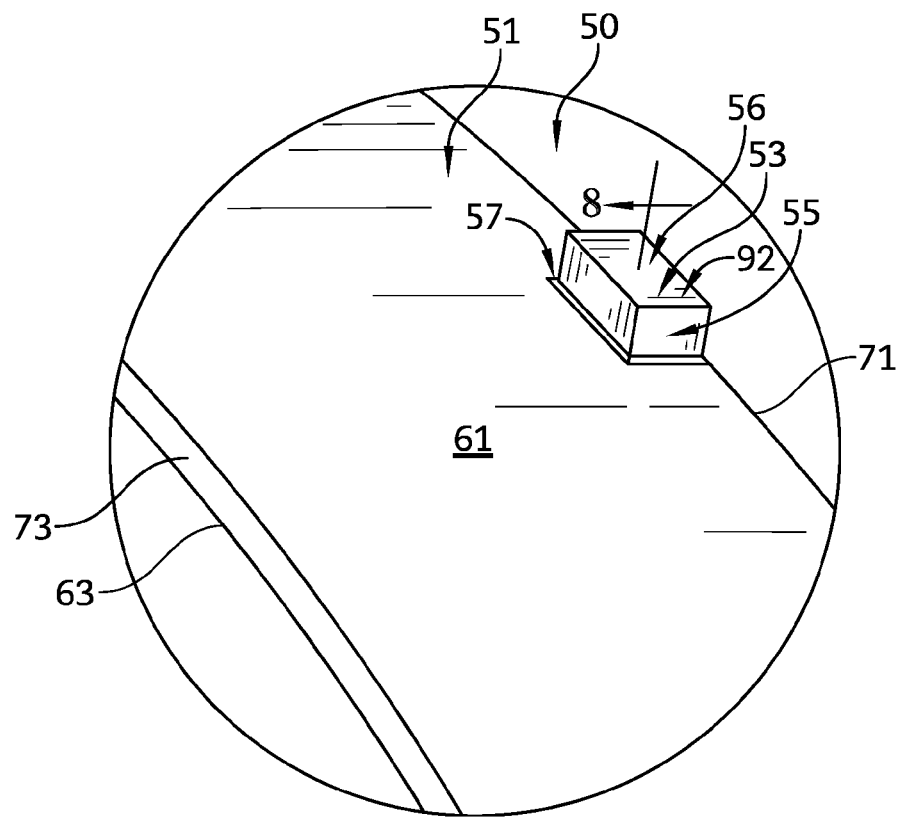
FIG. 7 is a detail perspective view of the blade track shown in FIG. 6 with the insert coupled to the annular runner to provide a radially extending key.
Figure 8:
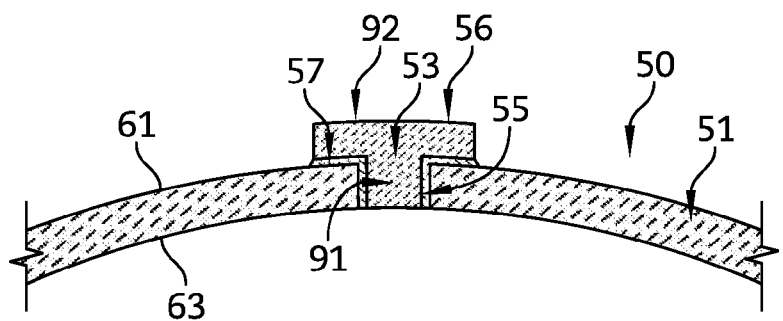
FIG. 8 is a cross-sectional view of the blade track of FIG. 7 showing that the insert extends partway through the annular runner and is coupled to the annular runner by a braze layer.

In the illustrative embodiment, the blade track 50 includes an annular runner 51 and a plurality of inserts 53 as shown in FIG. 4. The annular runner 51 is illustratively formed to include a plurality of cutouts 55 spaced circumferentially apart and sized to receive the plurality of inserts 53 as suggested in FIGS. 4 and 6-8. The plurality of inserts 53 are coupled to the annular runner 51 by arranging each insert 53 in a corresponding cutout 55 and bonding the inserts 53 to the annular runner 51 via brazing which adds a braze layer 57 between the annular runner 51 and each insert 53 as shown in FIGS. 7 and 8.

In some embodiments, instead of bonding the inserts 53 to the annular runner 51 using a braze layer 57, the inserts 53 may be integrally woven into a preform that is later hardened to create the annular runner 51 so that the inserts are bonded to the annular runner 51. In some such embodiments, the inserts 53 are machined after hardening of the annular runner 51 so that the inserts 53 have a predetermined shape/orientation relative to the geometry of the annular runner 51.

In some embodiments, instead of bonding the inserts 53 to the annular runner 51 using a braze layer 57, the inserts 53 may be welded to the annular runner 51 creating a weld between the inserts 53 and the annular runner 51 (similar to the braze layer 57). Filler materials would be used to form the welds and such filler materials may include silicon, a transition metal silicide, and/or a MAX phase material.

In some embodiments, instead of bonding the inserts 53 to the annular runner 51 using a braze layer 57, the inserts 53 may be co-processed with the annular runner 51 creating an integrated or monolithic component made up of the inserts 53 and the annular runner 51. Co-processing may include partially densifying each of the inserts 53 and the annular runner 51 into preforms, assembling the preforms, and further densifying the assembly to produce an integrated or monolithic component in which matrix material bonds the inserts 53 to the annular runner 51.

The annular runner 51 is illustratively made from a ceramic material; and, more particularly, a ceramic matrix composite (CMC) including silicon carbide fibers and silicon carbide matrix. For purposes of this application, a ceramic material is any monolithic ceramic or composite in which at least one constituent is a ceramic. In other embodiments, the annular runner 51 may be made of other metallic, non-metallic, or composite materials with low coefficients of thermal expansion.

Similarly, in the illustrative embodiment, each insert 53 is made from a ceramic material; and, more particularly, a ceramic matrix composite (CMC) including silicon carbide fibers and silicon carbide matrix. In other embodiments, each insert 53 may be made from monolithic silicon carbide, dense chopped fiber reinforced silicon carbide, monolithic silicon nitride based materials, monolitihic aluminum oxide, whisker reinforced aluminum oxide, and/or MAX phase materials (e.g. $Ti_3SlC_2$, $Ti_2AlC$, etc.). In still other embodiments, each insert 53 may be made of other metallic, non-metallic, or composite materials with low coefficients of thermal expansion that are compatible with both the carrier 48 and the annular runner 51.

The braze layer 57 is illustratively made from a transition metal and silicon. More particularly, some embodiments of the illustrative braze layer 57 include a combination of molybdenum (Mo) and silicon (Si), a combination of Niobium (Nb) and silicon (Si), or a combination of titanium (Ti) and silicon (Si). In some embodiments, the braze layer 57 may also include fluxing agents such as boron (B) and/or carbon (C). In some embodiments, the braze layer may include filler materials such as silicon carbide, polycarbosilanes, carbon, MAX phase materials, aluminum oxide, or other types of filler.

Figure 9:
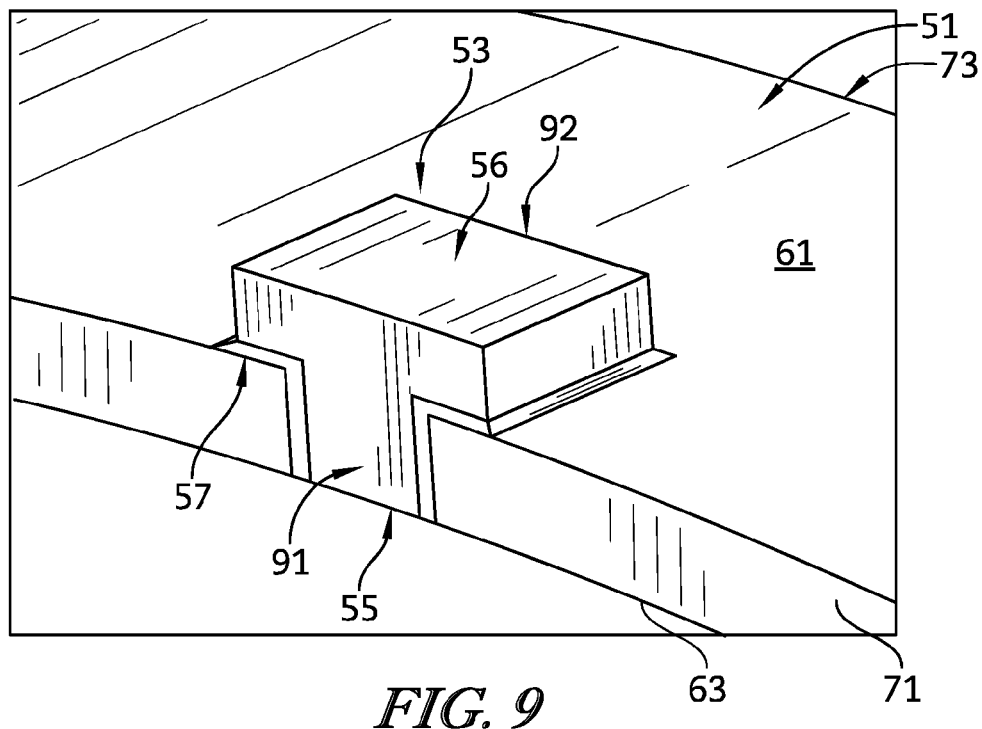
FIG. 9 is a detail perspective view of the blade track shown in FIGS. 2-8 showing that the insert includes a stem that extends into the annular runner and a cap that extends from the stem in both directions circumferentially around the annular runner and that extends axially forward along the annular runner.
Figure 10:
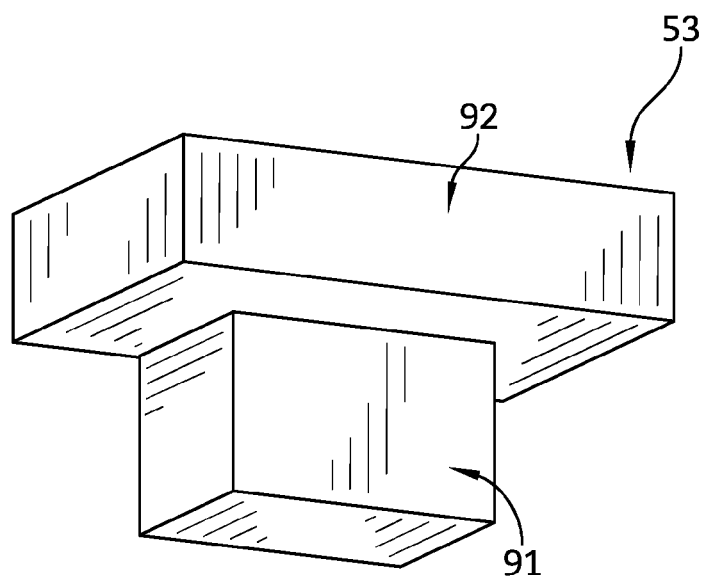
FIG. 10 is a detail perspective view of the insert shown in FIGS. 2-9.

The illustrative inserts 53 have an aft side 71 that is coplanar with the aft side of the annular runner 51 as shown in FIG. 9. Each insert 53 is formed to include a stem 91 and a cap 92 as shown in FIG. 6. The stems 91 are arranged in corresponding cutouts 55 formed in the annular runner 51. The caps 92 are arranged outside the cutouts 55. The caps 92 extend from the stems 91 in both radial directions around the outer radial surface of the runner 51 and extend in the axial direction forward from the stem 91 along the outer radial surface of the annular ceramic runner 51. The braze layers 57 bonding the inserts to the runner 51 are illustratively arranged in the cutout and between the radially outer surface 61 of the annular ceramic runner and the caps 92 of the inserts 53.

The cutouts 55 are illustratively sized to receive a portion of the insert 53 as shown in FIGS. 6-8. In other embodiments, the cutouts may be other shapes corresponding to the inserts 53. Additionally, the illustrative cutouts 55 extend inward in a radial direction all the way through the annular runner 51 from an outer radial surface 61 to an inner radial surface 63 of the annular runner 51 as shown in FIG. 6. In other embodiments, the cutouts 55 may extend part way through the annular runner 51 in the radial direction.

The annular runner 51 has a relatively low coefficient of thermal expansion because of its composition. Considering the relatively small coefficient of thermal expansion, the annular runner 51 can be designed to maintain a small gap between the blade track 50 and the blades 36 thereby improving performance of the engine 10.

Additionally, the annular runner 51 is a unitary component forming a full hoop as shown in FIG. 4. The annular runner 51 is a component of one-piece, continuous construction, rather than as a series of joined segments. This construction eliminates gaps that may be formed between parts of a multi-piece (or segmented) runner. The one-piece full hoop of the annular runner 51 encourages uniform radial expansion of the blade track 50 at high temperatures. Uniform radial expansion of the blade track 50 allows the blade track 50 to remain round at high temperatures which results in the ability to further maintain a small gap between the blades 36 and the blade track 50 while hot combustion products are being directed over the blades 36 and the blade track 50.

To accommodate the connection of the CMC blade track 50 to the metallic carrier 48 (which has a relatively high coefficient of thermal expansion), the turbine shroud 46 includes a cross-key connection 54 that is formed between the carrier 48 and the blade track 50 as shown, for example, in FIGS. 2 and 4. The cross-key connection 54 locates the blade track 50 relative to the carrier 48 while allowing radial translation of the blade track 50 relative to the carrier 48. The cross-key connection 54 illustratively includes a plurality of keys 56 and a plurality of corresponding keyways 58 sized and arranged to receive the plurality of keys 56.

Figure 5:
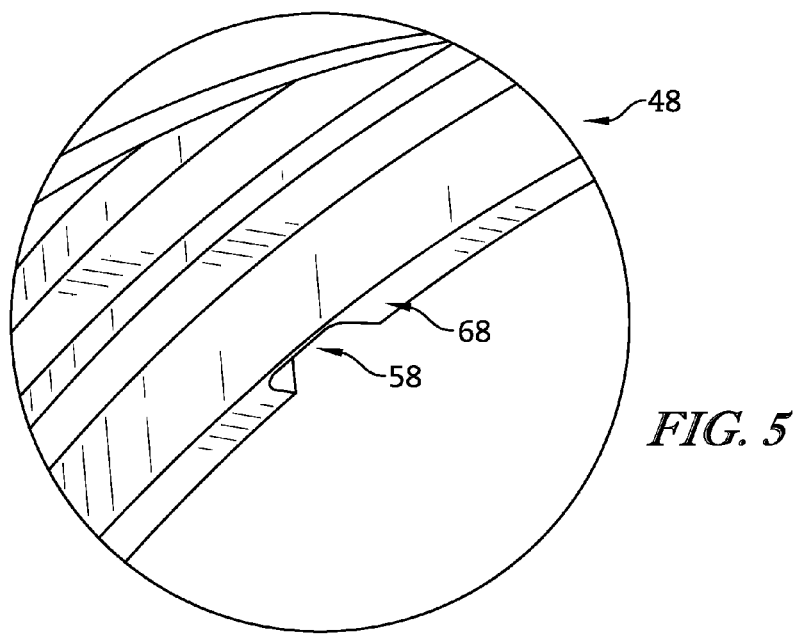
FIG. 5 is a detail perspective view of the carrier included in the turbine shroud shown in FIG. 4.

In the illustrative embodiment, the keys 56 are provided by the caps 92 of the inserts 53 that extend outward in the radial direction from the annular runner 51. The keyways 58 are formed in the carrier 48 and extend outward in the radial direction into the carrier 48 as shown in FIG. 5.

Referring now to FIG. 4, the carrier 48 is illustratively formed to include a connection flange 62, a connector 64, and a support band 68. The connection flange 62 is formed to include a bolt-hole pattern 66 adapted to be bolted between a combustor-case section 76 and a turbine-case section 78 included in the case 20. In another embodiment, the connection flange 62 could be hung from the case rather than bolted. The connector 64 extends inwardly in the radial direction and rearwardly in an axial direction from the connection flange 62 to form a frustoconical shape. The support band 68 extends inwardly in the radial direction from the connector 64 and the connection flange 62.

The support band 68 forms a downwardly-opening channel 80 that faces the blade track 50 as shown in FIG. 4. The downwardly-opening channel 80 is exposed to fluid communication with air radially outwardly of the blade track 50 via a vent hole pattern 69 formed in the support band 68 and a vent hole pattern 65 formed in the connector 64. In the illustrative embodiment, the plurality of keyways 58 extend outward in the radial direction into the support band 68 as shown in FIG. 5.

The retainer 52 is an annular metallic ring with a linear cross section as shown in FIGS. 3 and 4. The retainer 52 engages the aft side 82 of the support band 68 and the aft side 71 of the blade track 50 to locate the carrier 48 and the blade track 50 relative to the second stage vane assembly 22 as shown in FIG. 3.

According to at least one method of assembling the turbine shroud 46, a user first places each of the inserts 53 into a corresponding cutout 55 formed in the annular runner 51. Then the user brazes the inserts 53 in place forming the braze layer 57 between each insert 53 and the annular runner 51 to form the blade track 50.

When the blade track 50 is completed, the user rotates the blade track 50 to a predetermined orientation relative to the retainer 48 so that the keys 56 are aligned corresponding keyways 58. Then the user nests the blade track 50 into the retainer 48 so that the blade track 50 is concentric with the retainer. Next, the user inserts the keys 56 of the blade track 50 into the corresponding keyways 58 formed in the carrier 48 to thereby establish the cross-key connection 54 between the blade track 50 and the carrier 48.

Another illustrative blade track 250 is shown in FIGS. 11-15. The blade track 250 is configured for use in engine 10 and is substantially similar to the blade track 50 shown in FIGS. 1-10 and described herein. Accordingly, similar reference numbers in the 200 series indicate features that are common between the blade track 50 and the blade track 250. The description of the engine 10 and the blade track 50 is hereby incorporated by reference to apply to the blade track 250, except in instances when it conflicts with the specific description and drawings of the blade track 250.

Figure 11:
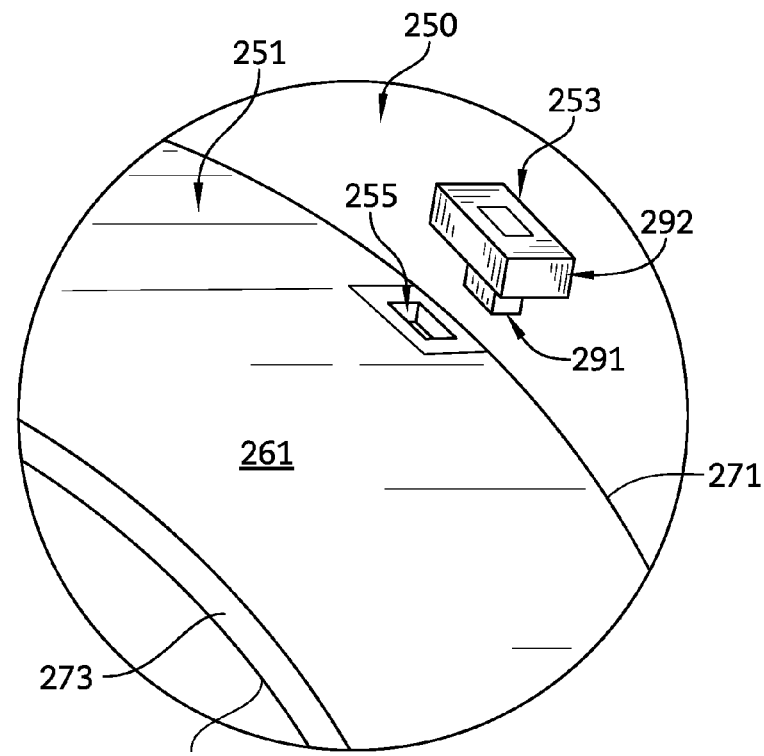
FIG. 11 is an exploded detail perspective view of another blade track adapted for use in the gas turbine engine of FIG. 1 showing that the blade track includes an annular runner and an insert.
Figure 12:
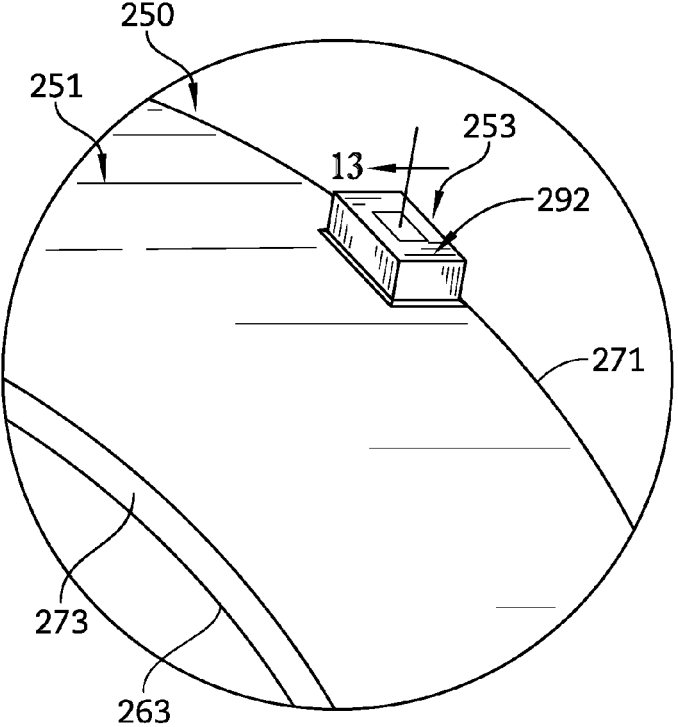
FIG. 12 is a detail perspective view of the blade track shown in FIG. 11 with the insert coupled to the annular runner to provide a radially extending key.

Unlike blade track 50, the cutout 255 formed in the annular runner 251 is spaced apart from the forward side 273 and the aft side 271 of the annular ceramic runner 251 as shown in FIG. 11. The cutout 255 is illustratively a blind hole that only extends part way through the annular runner 251. In other embodiments, the cutout may extend all the way through the runner 251.

Figure 13:
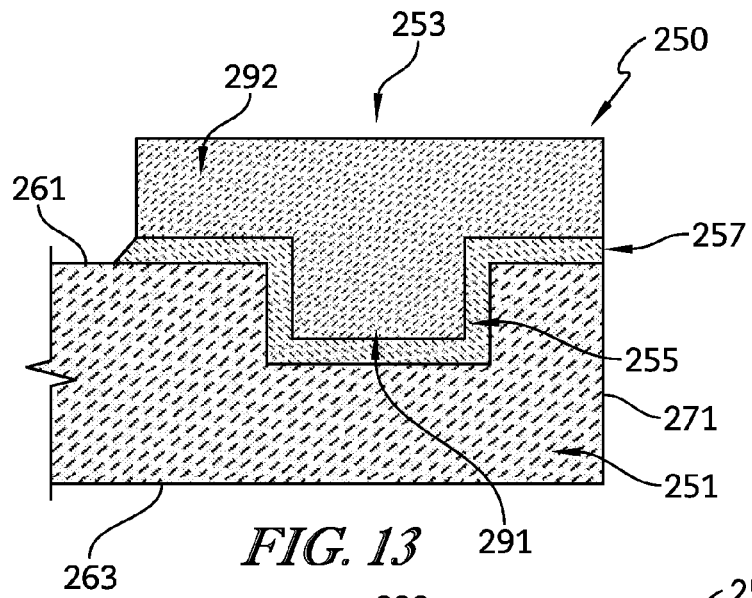
FIG. 13 is a partial cross-sectional view of the blade track of FIG. 12.
Figure 14:
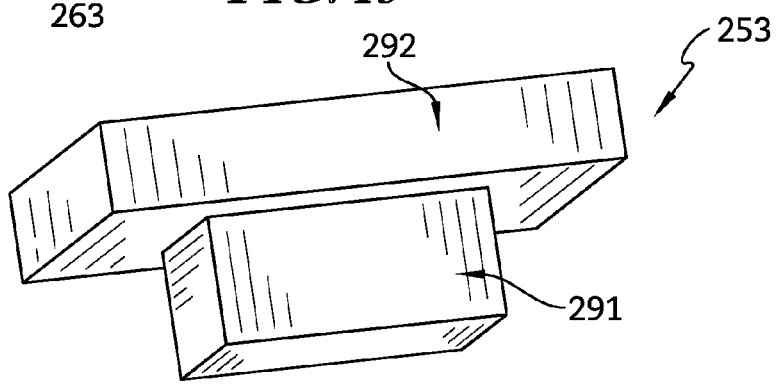
FIG. 14 is a perspective view of the insert of FIGS. 11-13 showing that the insert includes a stem that extends into the annular runner and a cap that extends from the stem in both directions circumferentially around the annular runner and that extends in both directions axially along the annular runner.
Figure 15:
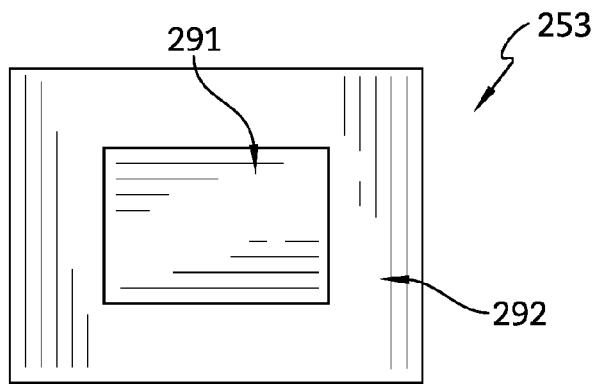
FIG. 15 is a bottom view of the insert of FIGS. 11-14 showing that the cap extends about the same amount in each circumferential direction and in each axial direction from the stem.

Additionally, the cap 292 of the inserts 253 extend along the outer radial surface 261 of the annular ceramic runner 251 in both axial directions. To accommodate the additional area of the cap 292, the braze layer 257 is arranged between the cap 292 and the outer radial surface 261 all the way around the stem 291. Finally, in this embodiment, an aft side of the cap 292 is arranged to be coplanar with the aft side 271 of the runner 251 as shown in FIG. 13.

Figure 16:
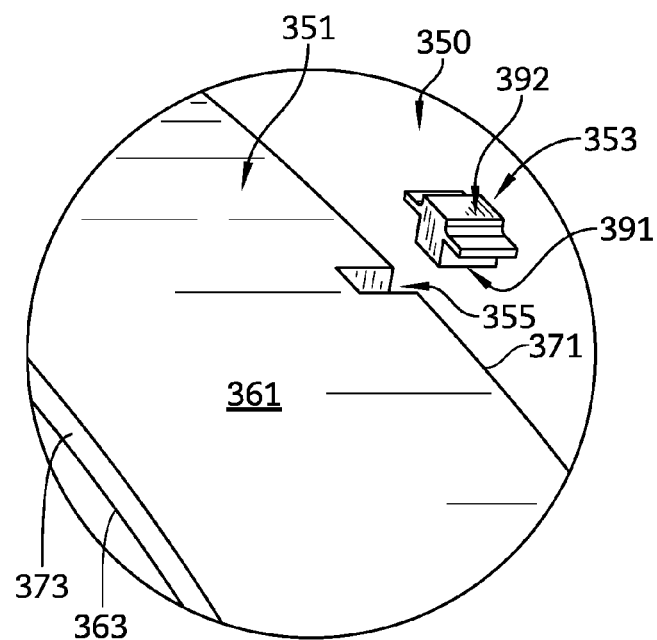
FIG. 16 is an exploded detail perspective view of another blade track adapted for use in the gas turbine engine of FIG. 1 showing that the blade track includes an annular runner and an insert.
Figure 17:
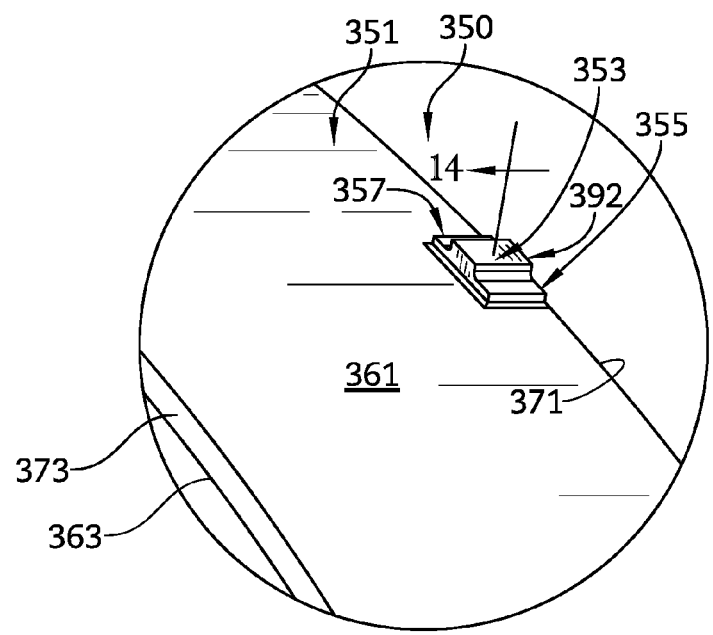
FIG. 17 is a detail perspective view of the blade track shown in FIG. 16 looking aft with the insert coupled to the annular runner to provide a radially extending key.
Figure 18:
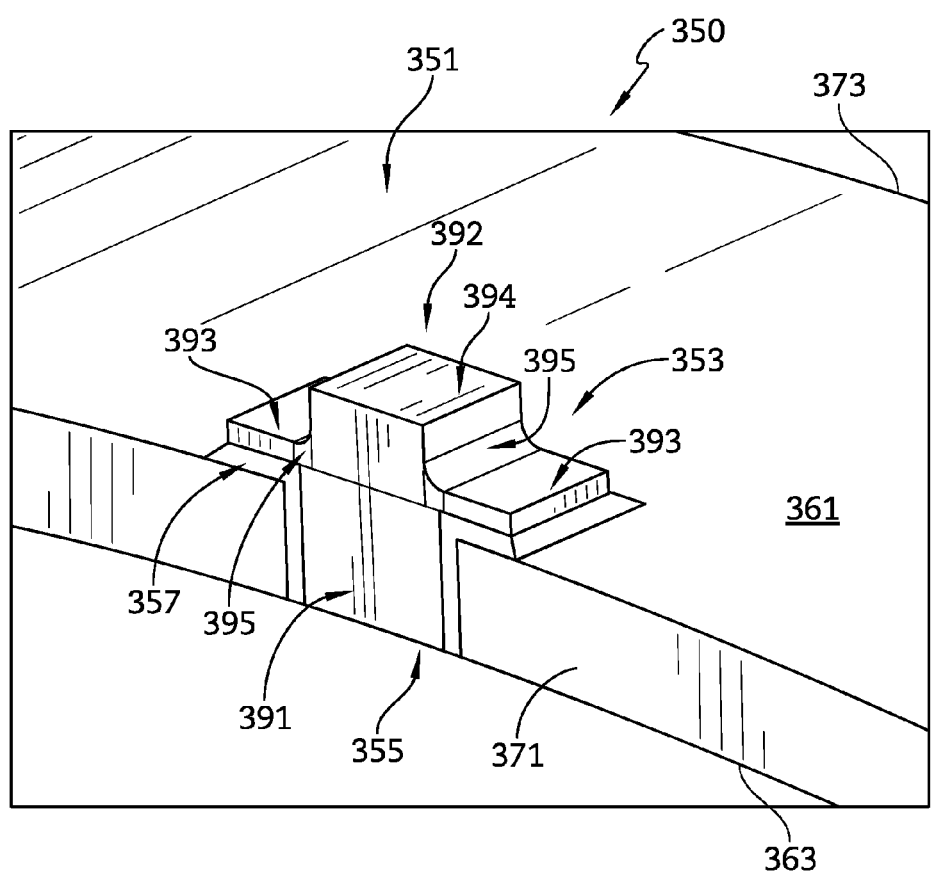
FIG. 18 is a detail perspective view of the blade track shown in FIG. 16 looking forward showing that the insert includes a stem that extends through the annular runner and a cap that cooperates with the stem to form a lower-case t shape.

Another illustrative blade track 350 is shown in FIGS. 16-18. The blade track 350 is configured for use in engine 10 and is substantially similar to the blade track 50 shown in FIGS. 1-10 and described herein. Accordingly, similar reference numbers in the 300 series indicate features that are common between the blade track 50 and the blade track 350. The description of the engine 10 and the blade track 50 is hereby incorporated by reference to apply to the blade track 350, except in instances when it conflicts with the specific description and drawings of the blade track 350.

Unlike blade track 50, the cap 392 of each insert 353 includes a radially-inner portion 393 and a radially outer portion 394 as shown in FIG. 18. The radially-inner portion 393 extends circumferentially along the outer radial surface 361 of the annular ceramic runner 351 in both circumferential directions. The radially-outer portion 394 extends radially outward from the stem 391 without extending circumferentially along the outer radial surface 361 of the annular ceramic runner 351. The cap 392 also includes fillets 395 that form a radius between the radially-outer portion 394 of the cap 392 and the radially-inner portion 393 of the cap on both circumferential sides of the radially-outer portion 394 of the cap 392. Accordingly, the stem 391 and the cap 392 cooperate to form a lower case t shape.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine blade track comprising
    an annular ceramic runner formed to include a plurality of cutouts extending inward in a radial direction from an outer radial surface of the annular ceramic runner toward an inner radial surface of the annular ceramic runner, and
    a plurality of inserts coupled to the annular ceramic runner, each insert including a stem arranged in the cutout and a cap arranged outside the cutout that extends from the stem in a circumferential direction and in an axial direction along the outer radial surface of the annular ceramic runner.

2. The turbine blade track of claim 1, further comprising a plurality of braze layers arranged between the annular ceramic runner and each of the plurality of inserts.

3. The turbine blade track of claim 2, wherein the braze layers arranged in the cutout and the braze layers are arranged between the radially outer surface of the annular ceramic runner and the caps of the inserts.

4. The turbine blade track of claim 3, wherein an aft side of each of the plurality of inserts is coplanar with an aft side of the annular ceramic runner.

5. The turbine blade track of claim 3, wherein the cutout is spaced apart from a forward side of the annular ceramic runner and from an aft side of the annular ceramic runner.

6. The turbine blade track of claim 5, wherein the cap extends along the outer radial surface of the annular ceramic runner in both axial directions.

7. The turbine blade track of claim 2, wherein the braze layers comprise silicon and a transition metal.

8. The turbine blade track of claim 7, wherein the braze layers include a fluxing agent including at least one of boron and carbon.

9. The turbine blade track of claim 8, wherein the braze layers comprise a filler material including at least one of silicon carbide, polycarbosilanes, carbon, aluminum oxide, and MAX phase material.

10. The turbine blade track of claim 1, wherein the annular ceramic runner and the inserts both consist essentially of ceramic matrix composite.

11. A turbine blade track comprising
an annular ceramic runner arranged around a central axis and formed to include a plurality of cutouts extending inward in a radial direction from an outer radial surface of the annular ceramic runner toward an inner radial surface of the annular ceramic runner,
a plurality of inserts coupled to the annular ceramic runner, each insert including a stem arranged in the cutout and a cap arranged outside the cutout,
and a plurality of braze layers arranged between the annular ceramic runner and each of the plurality of inserts,
wherein the cap of each insert includes a radially-inner portion that extends circumferentially along the outer radial surface of the annular ceramic runner in both circumferential directions and a radially-outer portion that extends radially outward from the stem without extending circumferentially along the outer radial surface of the annular ceramic runner.

12. The turbine blade track of claim 11, wherein the cap includes fillets that form a radius between the radially outer portion of the cap and the radially inner portion of the cap on at least two sides of the radially outer portion of the cap.

13. The turbine blade track of claim 11, wherein the stem and the cap cooperate to form a lower case t shape.

14. The turbine blade track of claim 11, wherein the cutout extends all the way through the annular ceramic runner from the outer radial surface to inner radial surface.

15. The turbine blade track of claim 11, wherein an inner radial surface of the stem is flush with the inner radial surface of the annular ceramic runner.

16. A turbine shroud comprising
a metallic carrier that extends around an engine axis and is formed to include a plurality of circumferentially spaced apart keyways that extend axially into the carrier,
a blade track including a ceramic annular runner formed to include a cutout, an insert arranged to extend into the cutout, and a braze layer bonded to the ceramic annular runner and the cutout,
wherein the insert includes a stem arranged in the cutout and a cap that extends outwardly in the radial direction from the stem to provide a key that extends into a corresponding keyway formed in the metallic carrier to establish a cross-key connection between the blade track and the metallic carrier and the cap extends along the outer radial surface of the annular ceramic runner in an axial direction.

17. The turbine blade track of claim 16, wherein an aft side of the insert is coplanar with an aft side of the annular ceramic runner.

18. The turbine blade track of claim 16, wherein the cap extends in both directions axially from the stem.

19. The turbine blade track of claim 18, wherein the cutout is spaced apart from a forward side of the annular ceramic runner and from an aft side of the annular ceramic runner.

20. The turbine blade track of claim 19, wherein an aft side of the cap is coplanar with an aft side of the annular ceramic runner.

* * * * *